United States Patent [19]

Gross et al.

[11] Patent Number: 5,212,242

[45] Date of Patent: May 18, 1993

[54] COATING COMPOSITION BASED ON A HYDROXYL-CONTAINING ADDITION POLYMER AND AN AMINO RESIN CROSSLINKING AGENT, AGENT AND CONTAINING ACID CATALYSTS HAVING HYDROXY GROUPS

[75] Inventors: Lutz-Werner Gross, Haltern, Fed. Rep. of Germany; Stefan Wieditz, Sylvania, Ohio; Werner-Alfons Jung, Ascheberg, Fed. Rep. of Germany

[73] Assignee: BASF Lacke+Farben Aktiengesellschaft, Munster, Fed. Rep. of Germany

[21] Appl. No.: 752,651

[22] PCT Filed: Feb. 8, 1990

[86] PCT No.: PCT/EP90/00201

§ 371 Date: Oct. 2, 1991

§ 102(e) Date: Oct. 2, 1991

[87] PCT Pub. No.: WO90/10039

PCT Pub. Date: Sep. 7, 1990

[30] Foreign Application Priority Data

Feb. 25, 1989 [DE] Fed. Rep. of Germany ....... 3905915

[51] Int. Cl.$^5$ ..................... C08L 29/02; C08L 61/26; C08L 29/16
[52] U.S. Cl. ................................... 525/162; 525/157; 525/569; 525/513; 525/519
[58] Field of Search ............... 525/162, 513, 519, 157, 525/509

[56] References Cited

FOREIGN PATENT DOCUMENTS 0064338 4/1981 European Pat. Off. .

*Primary Examiner*—James J. Seidleck
*Assistant Examiner*—W. R. M. Clark
*Attorney, Agent, or Firm*—Frank G. Werner; Anne Gerry Sabourin

[57] ABSTRACT

The invention relates to a coating composition containing

A) 50 to 90% by weight of one or more hydroxyl-containing addition polymers, prepared by copolymerization of ethylenically unsaturated monomers which are in part hydroxyalkyl esters of $\alpha,\beta$-ethylenically unsaturated carboxylic acids and B) 10 to 50% by weight of one or more amino resin crosslinking agents the sum of the proportions by weight of A and B being 100% by weight, and suitable auxiliaries and additives, optionally pigments, optionally fillers, organic solvent and an acid catalyst.

The coating composition is one wherein the acid catalyst used comprises
1) sulfo- or sulfonio[sic]-succinic esters which each contain at least one hydroxyl group and/or
2) sulfo- or sulfonio[sic]-succinic polyesters which each contain at least one hydroxyl group.

The invention furthermore relates to a process for the preparation of the coating compositions according to the invention and to their use as an automobile repair finish or as a stoving paint.

19 Claims, No Drawings

COATING COMPOSITION BASED ON A HYDROXYL-CONTAINING ADDITION POLYMER AND AN AMINO RESIN CROSSLINKING AGENT, AGENT AND CONTAINING ACID CATALYSTS HAVING HYDROXY GROUPS

The invention relates to a coating composition containing
A) 50 to 90% by weight of one or more hydroxyl-containing addition polymers, prepared by copolymerization of ethylenically unsaturated monomers which are in part hydroxyalkyl esters of $\alpha,\beta$-ethylenically unsaturated carboxylic acids and
B) 10 to 50% by weight of one or more amino resin crosslinking agents the sum of the proportions by weight of A and B being 100% by weight, and suitable auxiliaries and additives, optionally pigments, optionally fillers, organic solvent and an acid catalyst.

The present invention furthermore relates to processes for the preparation of this coating composition and the use of this coating composition for automobile repair finishing and as a stoving paint.

The crosslinking of paint films containing as the crosslinking component highly etherified melamine resins or other highly etherified amino resins and, as coreactant for these resins, hydroxyl-containing binders, has the disadvantage that this process is only operable at elevated temperatures.

For many applications it is undesirable to use high temperatures in the crosslinking process. This is true in particular for the field of automobile repair finishing. The use of polyisocyanates which leads to a reduction of the necessary crosslinking temperature is disadvantageous due to the toxicity of the polyisocyanates.

Furthermore it is known to use acid catalysts for the systems based on amino resin and hydroxyl-containing binder, in order thereby to reduce the stoving temperatures.

EP-B-64,338 discloses a coating composition based on hydroxyl-containing linear addition polymers and an essentially completely alkylated melamine-formaldehyde crosslinking agent, the acid catalyst used being a mixture of alkylated arylsulfonic acids. The mixture contains variously alkylated arylsulfonic acids.

EP-A-158,161 likewise discloses acid-curing coating compositions which in addition to melamineformaldehyde crosslinking agents also contain as binders hydroxyl-containing branched acrylate copolymers. Acid catalysts used are preferably sulfonic acid compounds or mixtures of different catalysts. Coating compositions which are fast curing at room temperature are obtained when the catalysts used are the mixtures of variously alkylated arylsulfonic acids disclosed in EP-B-64,338, but these coating compositions are significantly deficient with regard to the duration of the processibility of the coating compositions at room temperature (pot life). About 2 h after mixing the individual components of the coating composition, the viscosity of the system has already increased to twice the initial viscosity so that processing of the coating compositions is no longer possible or only possible with technical disadvantages. With these systems the haze of the resulting coatings is also in need of improvement.

The object of the present invention was therefore to provide coating compositions based on hydroxyl-containing addition polymers and amino resin crosslinking agents, which are fast curing at low temperatures, in particular at room temperature, but at the same time have as long a pot life as possible (at least about 4 h). The resulting coatings should moreover have as low a haze as possible and should have good hardness and good solvent resistance.

This object is surprisingly achieved by a coating composition containing
A) 50 to 90% by weight of one or more hydroxyl-containing addition polymers, prepared by copolymerization of ethylenically unsaturated monomers which are in part hydroxyalkyl esters of $\alpha,\beta$-ethylenically unsaturated carboxylic acids and
B) 10 to 50% by weight of one or more amino resin crosslinking agents the sum of the proportions by weight of A and B being 100% by weight, and suitable auxiliaries and additives, optionally pigments, optionally fillers, organic solvent and an acid catalyst.

This coating composition is one wherein the acid catalysts used comprise
1.) sulfo and/or sulfonio[sic]-succinic diesters which each contain at least one hydroxyl group and correspond to the following formulae (I) or (II):

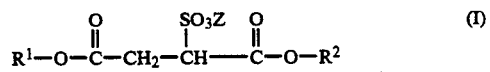

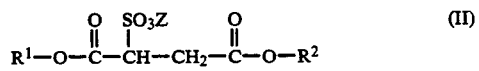

in which:
$R^1$ = a linear or branched alkyl or alkoxyalkyl radical having 2 to 12 carbon atoms and having 1, 2 or 3 hydroxyl groups
$R^2$ = a linear or branched alkyl or alkoxyalkyl radical having 2 to 12 carbon atoms and, if desired, up to 3 hydroxyl groups
$Z$ = H or $NH_nR_{4-n}$
with
$n$ = 0–4 and
$R$ = alkyl, hydroxyalkyl, aryl or hydroxyaryl, where R may be identical or different, or an aliphatic or aromatic N-heterocycle
and/or
2.) sulfo- and/or sulfonio[sic]-succinic polyesters which each contain at least one hydroxyl group.

The present invention furthermore relates to a process for the preparation of these coating compositions and their use as an automobile repair finish or as a stoving paint.

The sulfo- or sulfonio[sic]-succinic diesters which are used as hydroxyl-containing acid catalysts and also their preparation are known and described for the purpose of preparing detergents, wetting agents, emulsifiers and the like (cf. for example Stache, Tensid-Taschenbuch, published by Hanser-Verlag, Munich, Vienna 1981; US Patent 2,761,795; US Patent 2,454,546; GB-B-652,128). Suggestions that these sulfonio[sic]- or sulfosuccinic esters be used as catalysts in acid-curing coating compositions are, however, not to be found.

It was surprising and unforeseeable from the large number of known sulfonic acids that the use in particular of hydroxyalkyl sulfo- or sulfonio[sic]-succinates as catalysts would give rise to coating compositions based on hydroxyl-containing branched addition polymers and amino resin crosslinking agents which have a high reactivity at low temperatures, so that they can be used in automobile repair finishing, and at the same time a pot life of several hours at room temperature. Furthermore, it is advantageous that the resulting coatings have low haze while having good hardness and good solvent resistance.

The individual components of the coating compositions according to the invention and also the process for their preparation are explained in more detail below.

Suitable hydroxyl-containing addition polymers A are prepared by copolymerization of hydroxyalkyl esters of acrylic acid or methacrylic acid with alkyl esters of acrylic acid or methacrylic acid and/or other copolymerizable monomers. OH-functional monomers used are preferably 2-hydroxyethyl acrylate, 2-hydroxyethyl methacrylate, hydroxypropyl acrylate, hydroxypropyl methacrylate, 4-hydroxybutyl acrylate and 4-hydroxybutyl methacrylate.

Hydroxyalkyl esters of $\alpha,\beta$-ethylenically unsaturated carboxylic acids which are used may in part be reaction products of acrylic acid and/or methacrylic acid with the glycidyl ester of a carboxylic acid having a tertiary $\alpha$-carbon atom or of the glycidyl ester of an $\alpha,\beta$-ethylenically unsaturated carboxylic acid with a tertiary aliphatic carboxylic acid. It is also possible to use in part reaction products from one mole of hydroxyethyl acrylate and/or hydroxyethyl methacrylate with an average of 2 moles of $\epsilon$-caprolactone.

Hydroxyalkyl esters of $\alpha,\beta$-ethylenically unsaturated carboxylic acids which are used may, in a proportion of up to 75% by weight, preferably up to 50% by weight, relative to the total weight of the hydroxyalkyl esters, be hydroxyl-containing esters of acrylic acid and/or methacrylic acid in each case having a secondary hydroxyl group.

Other ethylenically unsaturated monomers which may be used for the preparation of component A are monomers with a carboxyl group, such as for example acrylic acid, methacrylic acid, crotonic acid, itaconic acid, maleic acid and fumaric acid. Other suitable compounds are alkyl esters of acrylic and methacrylic acid, such as for example methyl acrylate, ethyl acrylate, propyl acrylate, butyl acrylate, tert-butyl acrylate, isopropyl acrylate, isobutyl acrylate, pentyl acrylate, isoamyl acrylate, hexyl acrylate, 2-ethylhexyl acrylate, octyl acrylate, 3,5,5-trimethylhexyl acrylate, decyl acrylate, dodecyl acrylate, hexadecyl acrylate, octadecyl acrylate, octadecenyl acrylate and the corresponding methacrylates. Other suitable polymerizable monomers are styrene, vinyltoluene, alkoxyethyl acrylates and aryloxyethyl acrylates and also the corresponding methacrylates, esters of maleic and fumaric acid, acrylonitrile, methacrylonitrile, vinyl acetate and vinyl chloride. It is possible to use other monomers if these produce no undesired properties in the copolymer.

For component A, particular preference is given to the use of a branched acrylate copolymer which can be obtained by copolymerization of a₁) 10 to 60% by weight of hydroxyl-containing esters of acrylic acid and/or methacrylic acid having 2 to 14 carbon atoms in the alkyl radical, a₂) more than 3 and up to 30% by weight, preferably 5 to 25% by weight, of ethylenically unsaturated monomers having at least 2 polymerizable double bonds and a₃) 15 to 82% by weight of other polymerizable monomers having one olefinically unsaturated double bond, the sum of the proportions by weight of $a_1$, $a_2$ and $a_3$ being 100% by weight. Copolymers of this type and their preparation are described in EP-A-158,161.

The hydroxyl numbers of component A are preferably in the range of about 70 to 200 mg of KOH/g.

Examples of monomers suitable as components $a_1$ and $a_3$ are those monomers already mentioned on pages 6 and 7 of this description.

Compounds used as component $a_2$ are preferably those of the general formula

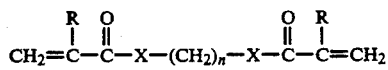

R = H or CH₃
X = O, N or S
n = 2 to 8.

Examples of compounds of this type are hexanediol diacrylate, hexanediol dimethacrylate, glycol diacrylate, glycol dimethacrylate, butanediol diacrylate, butanediol dimethacrylate and similar compounds.

Furthermore the component $a_2$ may advantageously be a reaction product of a carboxylic acid having a polymerizable, olefinically unsaturated double bond and glycidyl acrylate and/or glycidyl methacrylate or may be a polycarboxylic acid or unsaturated monocarboxylic acid which in each case has been esterified with an unsaturated alcohol. Moreover, polyvinyl compounds such as, for example, divinylbenzene are also suitable.

Furthermore, component $a_2$ may advantageously be a reaction product of a polyisocyanate and an unsaturated alcohol or amine. An example of this which may be mentioned is the reaction product from one mole of hexamethylene diisocyanate and 2 moles of allyl alcohol.

Furthermore, component $a_2$ may advantageously be a diester of polyethylene glycol and/or polypropylene glycol having an average molecular weight of less than 1500, preferably less than 1000, and acrylic acid and/or methacrylic acid. According to the invention component $a_2$ may also comprise acrylates having more than 2 ethylenically unsaturated double bonds, such as for example trimethylolpropane triacrylate or trimethylolpropane trimethacrylate. Obviously, combinations of these multiply unsaturated monomers can also be used.

Suitable amino resins (component B) are known urea, carbamide, melamine, benzoguanamine and glycoluril resins. The latter are commercially available for example under the trade name Cymel 1171 (Cyanamid).

Crosslinking components B in the coating compositions according to the invention are preferably amino resins of the melamine type. The melamine-formaldehyde crosslinking agents used have an average degree of methylolation of at least 0.65, preferably 0.9 to 1.0, and are etherified with monoalcohols to the extent of at least 80 mole %, preferably 90 to 100 mole %, relative to the maximum possible etherification. Suitable etherifying alcohols which may be mentioned are methanol, ethanol, propanol, iso-propanol, n-butanol, iso-butanol, tertbutanol, hexanols, heptanols and ethylhexanol. Particular preference is given to the use of hexamethoxymethylmelamine, which is commercially available under the trade name Cymel 301 (Cyanamid).

The acid catalysts used in the coating compositions according to the invention, namely hydroxy-functional sulfo- or sulfonio[sic]-succinic diesters and polyesters are known (cf. for example U.S. Pat. No. 5 2,761,795; U.S. Pat. No. 2,454,546; UK Patent 652,128 and Stache, Tensid-Taschenbuch, published by Hanser-Verlag, Munich, Vienna 1981) and can be prepared by different processes: these sulfonic acids for example can be obtained by sulfonation using gaseous sulfur dioxide of $\alpha,\beta$-unsaturated dicarboxylic acids and esterification of the resulting sulfosuccinic acid, as described in German Offenlegungsschrift 1,803,881.

It is particularly simple and requires no great complexity of apparatus to prepare hydroxy-functional sulfo- or sulfonio[sic]-succinic esters which are suitable as acid catalysts by the following process:

Maleic anhydride is first reacted with an alcohol component in the mole ratio of 1 mole of anhydride : 1 mole of polyol at between 70° and 100° C. in the presence of a conventional esterification catalyst until the monoester has completely formed (monitored by determining the acid number). More polyol is then added in the mole ratio of 1 mole of polyol:1 mole of monoester together with organic solvent and further esterification catalyst and the reaction mixture is slowly heated (ie. with a heating rate of about 2° C./min) to between 130° and 230° C. The resulting water of reaction is continuously removed from the reaction mixture by distillation and the esterification reaction is carried on until an acid number in the reaction product of below 5 mg of KOH/g, preferably below 3 mg of KOH/g, has been reached. The solvent is then distilled off, if necessary, under slightly reduced pressure.

The maleic ester obtained is now reacted at temperatures which are generally between 80° and 100° C. with an aqueous solution of hydrogen sulfite in a mole ratio of between 1:0.9 and 1:1.1. Here, the sulfonation reaction is continued until a degree of sulfonation of the maleic ester of 50 to 100%, preferably 80 to 100%, has been reached. However, if desired the sulfonation reaction may also be carried on only to lower degrees of sulfonation of less than 50%. In this case, the amount of acid catalyst used in the coating composition must be correspondingly increased. The excess of sulfur dioxide is then removed, for example by passing a stream of nitrogen through the solution. Hydrogen sulfite residues are removed by oxidation, for example by the addition of aqueous hydrogen peroxide solution. Solvent is then added and the water contained in the reaction mixture is distilled off by azeotropic distillation. In order to liberate the sulfonic acid, the mixture is acidified, for example with sulfuric acid.

Alcohol components which are suitable for the preparation of the acid catalysts are linear or branched polyols having 2 to 4 hydroxyl groups and 2 to 12 carbon atoms in the molecule. They may also be used as a mixture with monoalcohols. Examples of suitable alcohols are ethylene glycol, propylene glycol, butylene glycol, hexamethylene-1,6-diol, neopentyl glycol, pentanediol, 2-methylpentanediol, 2-ethylbutanediol, dimethylolcyclohexanediol, glycerol, timethylolethane [sic], trimethylolpropane, trimethylolbutane, pentaerythritol, di-trimethylolpropane and monoalcohols such as for example ethanol, propanol, butanol etc. Moreover ether alcohols are also suitable, for example diethylene glycol and triethylene glycol. Preference is given to the use of trimethylolpropane, propylene glycol and neopentyl glycol.

The acid catalysts may be used not only as free sulfonic acids but also in the form of their amine or ammonium salts. The sulfonium salts correspond to the general formula $R—SO_3Z$, where R represents the succinic ester radical. The radical Z may for example denote H or $NH_nR^14—n$ (n=0-4), where $R^1$ may denote identical or different alkyl, hydroxyalkyl, aryl or hydroxyaryl radicals.

R may for example denote: methyl, ethyl, propyl, iso-propyl, n-butyl, tert-butyl, iso-butyl, pentyl, iso-amyl, hexyl, hydroxyethyl, hydroxypropyl, hydroxybutyl, hydroxyhexyl, phenyl, toluyl, naphthyl or hydroxyphenyl.

Z may also be an aliphatic or aromatic N-heterocycle which for example is derived from pyridine, oxazolidine, hydropyridine, morpholine, pyrrole, imidazole, picoline and piperidine.

Depending on the field of application, hydroxy-functional sulfonic acid catalysts are used in a proportion of 0.1 to 10, preferably 0.1 to 5% by weight, relative to the binder solids. Binder solids is understood to mean the sum of the solids of the components A and B. If it is desired to cure the coating composition at low temperature, ie. at about room temperature, the acid catalyst is used in a proportion of more than 1 and up to 10% by weight, preferably 2 to 5% by weight, relative to the binder solids. Moreover, in this case it is preferable to use the sulfonic acid catalysts in the form of their free acids. If the coating composition is used as a stoving paint, a proportion of 0.1 to 2% by weight, preferably 0.1 to 1% by weight, relative to the binder solids is completely adequate.

The hydroxy-functional catalysts mentioned above may also be used together with non-hydroxy-functional organic sulfonic acids in the coating compositions according to the invention. Here, it should be ensured that the proportion of non-hydroxy-functional organic sulfonic acids is not more than 50% by weight, relative to the total weight of catalysts used. Suitable non-hydroxy-functional sulfonic acids are para-toluenesulfonic acid, xylenesulfonic acids, ethylbenzenesulfonic acids, methylnaphthalenesulfonic acids, p-octylbenzenesulfonic acid, p-dodecylbenzenesulfonic acid, branched-chain $C_{13}$-alkylbenzenesulfonic acid and di-($C_9$-alkyl)naphthalenedisulfonic acid.

The coating compositions according to the invention additionally contain organic solvents, optionally pigments and fillers, and also suitable auxiliaries and additives in the customary amounts.

Suitable organic solvents, which are preferably used in an amount of 30 to 90% by weight, relative to the total composition of the coating composition, are aliphatic, cycloaliphatic and aromatic hydrocarbons, esters, ethers and ketones. Examples of these are various white spirits, tetralin, decalin, Solvent Naphtha ®, heavy benzol, various Solvesso ® grades, various Shellsol ® grades and Deasol ®, dioxane, ethylene glycol dibutyl ether, ethylene glycol diethyl ether, diethylene glycol dimethyl ether, dibutyl ether, cyclohexanone, methyl ethyl ketone, acetone, isophorone, methyl n-butyl ketone, methyl isobutyl ketone, methyl n-amyl ketone, diethyl ketone, ethyl butyl ketone, diisopropyl ketone, diisobutyl ketone, acetylacetone, methyl acetate, ethyl acetate, propyl acetate, butyl acetate, amyl acetate, methylglycol acetate and ethylglycol acetate.

Examples of customary auxiliaries and additives, which are preferably used in amounts of 0 to 10% by weight, relative to the total composition of the coating composition, are flow control agents, silicone oils, plasticizers such as phosphoric esters and phthalic esters, viscosity-controlling additives, flatting agents, UV absorbers and light stabilizers.

Examples of pigments which may be added if desired are metal pigments, such as for example aluminum platelet pigments and special effect pigments made from micaceous platelets (for example mica) coated with metal oxides, which are preferably used in amounts of 0 to 20% by weight, relative to the total composition. If desired, it is also possible to use white or color pigments, alone or in combination with the special effect or metal pigments, preferably in amounts of 0 to 40% by weight, relative to the total composition of the coating composition. Examples of these are inorganic and organic pigments, such as for example various iron oxide grades, titanium dioxide, graphite, carbon black, zinc, strontium chromate, barium chromate and lead chromate, lead cyanamide, lead silicochromate, zinc oxide, cadmium sulfide, chromium oxide, zinc sulfide, nickel titanium yellow, chrome titanium yellow, ultramarine blue, phthalocyanine complexes, naphthol red, quinaridones [sic], halogenated thioindigo pigments or the like.

Suitable fillers are for example talc, mica, kaolin, chalk, quartz powder, asbestos powder, slate powder, barium sulfate, various silicas, silicates, glass fibers, organic fibers and the like. They are preferably used in amounts of 0 to 50% by weight, relative to the total composition of the coating composition.

The coating compositions according to the invention are formulated as two- and three-component systems, but preferably as three-component systems. In particular, if the acid catalysts comprise the ammonium salts of the hydroxy-functional sulfonic acids, one or two-component systems can be prepared from the coating compositions according to the invention. In this case the sulfonic acids are only liberated with the use of elevated temperatures.

In the above three-component system, paint component I contains the hydroxyl-containing addition polymer A, paint component II contains the amino resin and paint component III contains the acid curing catalyst.

In the case of the three-component systems, paint components I, II and III are mixed shortly before the coating composition is applied. The duration of processibility ("pot life") of the mixture is generally above 5 h, while paint components I, II and III individually are stable for several months.

The preparation of paint components I, II and III is carried out in the conventional manner by mixing the components present in each. Occasionally it is advisable, if a component is not present in liquid form, first to dissolve it in a solvent and to mix the solution with the other components.

If the coating composition contains pigments, these are preferably incorporated into paint component I, which contains the hydroxyl-containing addition polymer. This can be carried out for example by milling the pigments with the binder or the addition polymer or by incorporating a pigment paste.

The coating compositions according to the invention cure in the temperature range from room temperature up to about 100° C., but may also be used at higher temperatures.

Due to the low curing temperatures, they are particularly suitable for automobile repair finishing.

They may however also be used as a clear coat, a primer or a top coat and also as a base coat containing metal pigments or as the clear coat of a multilayer metallic finish.

These coating compositions can be applied by spraying, flow-coating, dip-coating, roller-coating, knife coating or brush coating onto a substrate in the form of a film, and the film is then cured to form a firmly adhering coating.

In particular, the coating compositions according to the invention have a high reactivity combined with a pot life of several hours. The resulting coatings have low haze coupled with good hardness and good solvent resistance.

The invention is explained in more detail below with the aid of exemplary embodiments. All parts and percentages are by weight unless explicitly stated otherwise.

I. Preparation of the hydroxy-functional catalysts

I.1. Preparation of a hydroxy-functional sulfosuccinic ester 733 g of maleic anhydride, 778 g of neopentyl glycol and 2.3 g of dibutyltin oxide are heated under nitrogen to 80° C. in a jacketed steel vessel equipped with an oil thermostat, stirrer, thermocouple and a reflux condenser with a water separator. After an acid number of 290 has been reached, 778 g of neopentyl glycol, 293 g of toluene and 3 g of p-benzoquinone are added and the mixture is slowly heated to 171° C. The resulting water is removed by distillation from the equilibrium. After an acid number of 1.6 has been reached, the toluene is distilled off under slightly reduced pressure.

750 g of the maleic ester A prepared in this manner are heated to 100° C. in a glassware apparatus equipped with a heating mantle, stirrer, dropping funnel and reflux condenser and then 438 g of a 50% strength aqueous solution of ammonium hydrogen sulfite are added dropwise over a period of 1 h. The temperature is then maintained for 6 h. Then a stream of nitrogen is passed through the solution for 30 min in order to remove the excess sulfur dioxide. In order to oxidize residues of ammonium hydrogen sulfite, 35 ml of 30% strength hydrogen peroxide solution are added at 70° C. Then 300 g of n-butanol are added and the water which is present is distilled off by azeotropic distillation at 107° C., using slightly reduced pressure towards the end. Intermediate 1A is obtained.

In order to liberate the acid, 780 g of n-butanol are initially introduced and 102.3 g of 98% strength sulfuric acid are slowly added dropwise at 0° C., using an icebath. 1.349 g of the intermediate 1A obtained above are added dropwise with stirring over a period of 6 h to this icecold solution of sulfuric acid in butanol. During this procedure, the reaction temperature is kept below 10° C. The precipitated ammonium sulfate is filtered off. A yellow-orange colored solution of sulfonic acid 1 is obtained having a content of 33%.

I.2. Preparation of a hydroxy-functional sulfosuccinic ester 2

In the apparatus described in the preparation of the polyester A, 980 g of maleic anhydride, 760 g of propylene glycol and 2 g of dibutyltin oxide are reacted at a maximum temperature of 80° C. until the acid number 316 is reached. Then 760 g of propylene glycol, 125 g of toluene and 2.5 g of p-benzoquinone are added and the mixture is boiled under a water separator at 144° C. until an acid number of 2 has been reached. The solvent is then distilled off and the polyester B is thereby obtained.

In the apparatus described for the preparation of sulfonic acid 1, by a method similar to 1, 750 g of polyester B are heated to 100° C., 557 g of a 50% strength aqueous solution of ammonium hydrogen sulfite are added dropwise over a period of 1 h and then the temperature is maintained at 100° C. for 6 h. A stream of N₂ is then passed through the solution for 30 min in order to remove the excess sulfur dioxide. Then 45 ml of 30% strength hydrogen peroxide solution followed by 300 g of n-butanol ar added at 70° C. and the water of reaction is distilled off by azeotropic distillation by a method similar to 1. An intermediate 2A is obtained.

In order to liberate the acid, 1,456 g of n-butanol are initially introduced and 137.6 g of 98% strength sulfuric acid are slowly added dropwise at 0° C., using an icebath. 1,000 g of the intermediate 2A are added dropwise with stirring to this solution over a period of 6 h at a temperature of less than 10° C. The precipitated ammonium sulfate is filtered off. A solution of sulfonic acid 2 with an acid content of 26% is obtained.

I.3 Preparation of a hydroxy-functional sulfosuccinic ester 3

In the apparatus described for the preparation of the polyester A, 784 g of maleic anhydride, 1,072 g of trimethylolpropane and 1.84 g of dibutyltin oxide are reacted at 80° C. until an acid number of 219 is reached. Then 1,072 g of trimethylolpropane, 146.4 g of toluene and 2.96 g of p-benzoquinone are added and the mixture is boiled at 200° C. under a water separator until an acid number of 1.3 has been reached. The solvent is then distilled off and the polyester C is thereby obtained.

The sulfonic acid 3 is prepared by a method similar to the preparation of the sulfonic acid 1, but using the following amounts of the individual reagents:

For the preparation of intermediate 3A:
750 g of polyester C
419 g of 50% strength aqueous ammonium hydrogen sulfite solution
34 ml of 30% strength hydrogen peroxide solution
300 g of n-butanol
For the preparation of sulfonic acid 3:
1,170 g of n-butanol
76.5 g of 98% strength sulfuric acid
800 g of intermediate 3A
A solution of sulfonic acid 3 results having an acid content of 30%.

I.4. Preparation of various catalyst solutions

Using sulfonic acids 1-3 described above and using a mixture of technical grade p-toluenesulfonic acid and technical grade dodecylbenzenesulfonic acid as comparison catalyst, various catalyst solutions are prepared, the composition of these being given in Table 1.

TABLE 1

| Composition of the catalyst solutions | | | | |
|---|---|---|---|---|
| Acid solution | 1 | 2 | 3 | 4 |
| p-TSA[1] | — | — | — | 14.0 |
| DBS[2] | — | — | — | 6.0 |
| Sulfonic acid 1 | 33.5 | — | — | — |
| Sulfonic acid 2 | — | 26.0 | — | — |
| Sulfonic acid 3 | — | — | 30.7 | — |
| Butanol | 66.5 | 74.0 | 69.3 | 56.0 |

TABLE 1-continued

| Composition of the catalyst solutions | | | | |
|---|---|---|---|---|
| Acid solution | 1 | 2 | 3 | 4 |
| Isopropanol | — | — | — | 24.0 |

[1] p-TSA = para-toluenesulfonic acid (technical grade)
[2] dodecylbenzenesulfonic acid (technical grade)

II. Preparation of a hydroxyl-containing acrylate resin I

The following ingredients are initially introduced into a 4 liter stainless steel vessel and heated to 110° C.:
757.5 parts of butyl acetate
402.6 parts of 1-methoxy-2-propyl acetate
20 The following ingredients are weighed into the monomer tank and mixed:
210 parts of methyl methacrylate
141 parts of 2-hydroxyethyl methacrylate
210 parts of styrene
141 parts of n-butyl acrylate
349.5 parts of 1,4-butanediol monoacrylate
210 parts of hexanediol diacrylate
138 parts of 2-ethylhexyl acrylate
63 parts of 2-mercaptoethanol
The following ingredients are weighed into the initiator tank and mixed:
47.4 parts of 2,2-azobis-(2-methylbutanenitrile)
234.6 parts of butyl acetate
94.4 parts of 1-methoxy-2-propyl acetate
The contents of the monomer tank are metered in over 3 h, and the contents of the initiator tank are metered in over 3.5 h. The feeds are started simultaneously. During the polymerization the temperature is kept at 110° C. When feeding has finished, the reaction mixture is allowed to polymerize further for 3 hours.

The acrylate resin solution I thus obtained has a viscosity of 1.8 dPa.s and a solids content of 50% (130° C., 60 min).

III. Preparation of pigment pastes

The components given in Table 2 are milled in a laboratory sand grinder to a Hegman fineness of less than 10 μm.

TABLE 2

| Composition of the pigment pastes | | |
|---|---|---|
| Pigment paste | green | red |
| Acrylate resin I | 63.30 | 61.16 |
| Pigment Green 7 from BASF AG | 4.0 | — |
| Pigment Yellow 151 from Hoechst | 1.0 | — |
| Pigment White 6 from Tioxide | 4.0 | — |
| Pigment Red 122 from Hoechst | — | 4.0 |
| Pigment Red 104 from BASF AG | — | 8.0 |
| Butyl acetate | 10.00 | 10.00 |
| Methoxypropyl acetate | 13.70 | 16.84 |
| Binder solids | 44.0 | 40.0 |
| Pigment | 9.0 | 12.0 |

EXAMPLES 1-6

Using the green or red pigment paste, a green or red top coat is prepared in a known manner from the components given in Table 3 by mixing, and to this are added with stirring the various acid solutions 1-3 in the amount given in Table 4.

The coating composition obtained is now immediately drawn down on glass panels and dried as follows:

Sample 1

After stoving for 30 minutes at 60° C. the coated glass panels are kept for a further 24 hours or alternatively for 6 days at room temperature and then the König pendulum hardness is determined. The results of this test are shown in Table 5.

Sample 2

The glass panels are kept after application of the coating composition for 6 days at room temperature and then the König pendulum hardness is determined. The results of these tests are shown in Table 5.

Furthermore, the pot life of the coating compositions obtained is determined in each case, this being understood to mean the time in which the viscosity of the coating compositions has risen to twice the initial viscosity.

Furthermore, the coating composition obtained is also applied to steel sheets which have been coated with a commercially available primer based on a polyaminoamide of a dimeric fatty acid and an epoxy resin based on bisphenol A having an epoxy equivalent weight of 450–500. These sheets are dried for 30 min at 60° C. and the gloss is investigated in accordance with DIN 50017 after exposure for 240 h in a constant test atmosphere with condensation. Moreover, the solvent resistance of the coatings resulting in each case was investigated by spraying the coating composition onto glass panels and then curing it by storing for 7 days at room temperature. The results of these tests are given in Table 6. The haze of the coatings was investigated by spraying the coating compositions onto glass panels and drying them for 30 min at not more than 60° C. The results of these tests are likewise given in Table 6.

COMPARISON EXAMPLES 1 AND 2

By a method similar to Example 1 or 4, using the green or red top coat and by adding acid solution 4, a green or red coating composition is prepared (cf. Tables 3 and 4), which is applied to glass panels by a method similar to Examples 1 to 6 and to steel sheets coated with an primer. The curing of the films and the testing of the resulting coatings is carried out by a method similar to Examples 1–6. The results of the investigations are given in Tables 5 and 6.

TABLE 3

| Composition of the green or red top coat | | |
|---|---|---|
| Top coat | green | red |
| Acrylate resin I | 3.20 | — |
| Pigment paste, green | 67.00 | — |
| Pigment paste, red | — | 70.00 |
| HMMM resin[1] | 10.70 | 9.52 |
| Butanol | 14.60 | 15.00 |
| Tetralin | 3.00 | 3.00 |
| Silicone oil (5%) | 1.50 | 1.50 |
| Methoxypropyl acetate | — | 0.98 |

[1] Hexamethoxymethylmelamine resin Cymel ® 301, a commercial product from Cyanamid.

TABLE 4

| | Composition of the coating compositions | | | | | | | |
|---|---|---|---|---|---|---|---|---|
| Example | 1 | 2 | 3 | V1 | 4 | 5 | 6 | V2 |
| Top coat, green | 100 | 100 | 100 | 100 | — | — | — | — |
| Top coat, red | — | — | — | — | 100 | 100 | 100 | 100 |
| Acid solution 1 | 4.40 | — | — | — | 3.90 | — | — | — |
| Acid solution 2 | — | 5.66 | — | — | — | 5.02 | — | — |
| Acid solution 3 | — | — | 4.80 | — | — | — | 4.25 | — |
| Acid solution 4 | — | — | — | 6.30 | — | — | — | 5.60 |

TABLE 5

| Test results on the coating compositions applied to glass | | | | | | | | |
|---|---|---|---|---|---|---|---|---|
| Example | 1 | 2 | 3 | V1 | 4 | 5 | 6 | V2 |
| Film thickness (wet) (μm) | 25 | 25 | 25 | 25 | 25 | 25 | 25 | 25 |
| Pot life (h) | >5 | >5 | >5 | 1.5 | >5 | >5 | >5 | 2.0 |
| Pendulum hardness (König) in s after stoving (30 min/60° C.) and storage at RT for | | | | | | | | |
| 1 day | 62 | 46 | 36 | 48 | 53 | 64 | 34 | 53 |
| 6 days | 90 | 66 | 94 | 62 | 118 | 69 | 88 | 69 |
| Pendulum hardness (König) in s after storage for 6 days at room temperature (RT) | 70 | 63 | 64 | 62 | 87 | 80 | 62 | 76 |

TABLE 6

| | Test results | | | | | | | |
|---|---|---|---|---|---|---|---|---|
| Example | 1 | 2 | 3 | V1 | 4 | 5 | 6 | V2 |
| Film thickness (wet) (μm) (sheet metal) | 50 | 50 | 50 | 50 | 50 | 50 | 50 | 50 |
| Haze index[1] | 0.64 | 0.48 | 0.49 | 0.78 | 0.87 | 0.71 | 0.69 | 1.26 |
| Gloss (20°) in % | 79.0 | 82.0 | 82.0 | 80.0 | 77.0 | 78.0 | 80.0 | 74.0 |
| Gloss (20°) in % after conditioning[2] | 76.0 | 72.0 | 74.0 | 73.0 | 75.0 | 74.0 | 70.0 | 72.0 |
| Solvent resistance[3] after storage for 7 days at RT xylene | 2/0–1 | 0/0 | 2/0–1 | 1/0 | 2/0 | 0–1/0 | 2/0–1 | 2/0 |

TABLE 6-continued

| Example | Test results | | | | | | | |
|---|---|---|---|---|---|---|---|---|
| | 1 | 2 | 3 | V1 | 4 | 5 | 6 | V2 |
| FAM | 2/0–1 | 0–1/0 | 2/0–1 | 1–2/0 | 2/0 | 2/0 | 2/0–1 | 2/0 |

Key to Table 6:

[1] The haze index g is defined as:

$$g = \frac{I_{43} - I_o}{I_o \text{ diff}} \text{ where}$$

$I_{43}$ = 45° incident beam, intinsity at 43°
$I_o$ = 45° incident beam, intensity at 0°
$I_o$ diff = 45° incident beam, intensity at 0° with an ideally diffuse surface

[2] Conditioning: constant test atmosphere with condensation in accordance with DIN 50017

[3] The solvent resistance of the resulting coating was determined after the coating had been cured by storage for 7 days at room temperature, by allowing felt disks (diameter: 5 cm) impregnated with xylene or test fuel in accordance with DIN 51604 ("FAM") to remain covered on the film for 5 min. Then the marking of the film (0 = no marking; 3 = significant marking) and the softening of the film (0 = no softening; 3 = significant softening) are assessed.

The performance characteristics (pot life) of the top coats were determined more precisely by preparing further samples of the top coats of Examples 2, 5, V1 and V2 and examining the increase in viscosity of these ready-to-use, catalyst-containing top coats when stored at room temperature. The results are given in Table 7.

TABLE 7

Determination of the flow times, from a DIN 4 cup at 23° C., of the top coats of Examples 2, 5, V1 and V2 after storage of the top coats at room temperature

| Storage time (h) | Flow time (s) of the top coats | | | |
|---|---|---|---|---|
| | 2 | V1 | 5 | V2 |
| 0.0 | 17.0 | 16.5 | 17.0 | 17.0 |
| 0.5 | 18.0 | 19.5 | 18.0 | 18.0 |
| 1.0 | 18.0 | 23.0 | 19.0 | 19.0 |
| 1.5 | 18.5 | 28.5 | 19.0 | 20.0 |
| 2.0 | 19.0 | 39.0 | 20.0 | 22.0 |
| 2.5 | 20.0 | 55.0 | 20.5 | 25.0 |
| 3.5 | 21.0 | gelled | 22.0 | 30.0 |
| 4.0 | 22.0 | | 23.0 | 35.0 |
| 5.0 | 23.5 | | 25.5 | 45.0 |
| Pot life (h) | >5 | 1.5 | >5 | 3.5 |

Summary of the test results

Examples 1 to 6 and the Comparison Examples 1 and 2 show that the coating compositions according to the invention are fast curing at low temperatures but exhibit significantly increased pot lives in comparison with systems based likewise on branched acrylates in which, however, the acid catalysts used are mixtures of variously alkylated arylsulfonic acids. In comparison with coating compositions of that type, the haze index is likewise improved, while hardness and gloss have comparable values.

We claim:

1. A coating composition, comprising
   A) 50 to 90% by weight of one or more hydroxyl-containing addition polymers, prepared by copolymerization of ethylenically unsaturated monomers which are in part hydroxyalkyl esters of α,β-ethylenically unsaturated carboxylic acids, and
   B) 10 to 50% by weight of one or more melamineformaldehyde crosslinking agents the sum of the proportions by weight of A and B being 100% by weight, and suitable auxiliaries and additives, optionally pigments, optionally fillers, organic solvent and an acid catalyst, wherein the acid catalyst used comprises:

1) a sulfo- or sulfono-succinic diester which contains at least one hydroxyl group and corresponds to the following formulae (I) or (II):

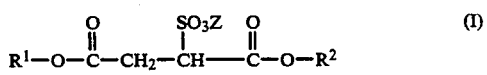

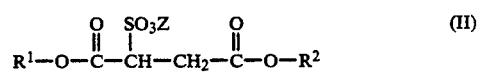

in which:
R¹ = a linear or branched alkyl or alkoxyalkyl radical having 2 to 12 carbon atoms and having 1, 2 or 3 hydroxyl groups
R² = a linear or branched alkyl or alkoxyalkyl radical having 2 to 12 carbon atoms and, if desired, up to 3 hydroxyl groups
Z = H or $NH_nR_{-n}$
with
n = 0–4 and
R = alkyl, hydroxyalkyl, aryl or hydroxyaryl, where R may be identical or different, or an aliphatic or aromatic N-heterocycle
and/or 2) a succinic polyester sulfonic acid and/or succinic polyester sulfonium salt in each case containing at least on hydroxyl group.

2. A process for the preparation of a coating composition comprising
   A) 50 to 90% by weight of one or more hydroxyl-containing addition polymers, prepared by copolymerization of ethylenically unsaturated monomers which are in part hydroxyalkyl esters of α,β-ethylenically unsaturated carboxylic acids and
   B) 10 to 50% by weight of one or more melamineformaldehyde crosslinking agents the sum of the proportions by weight of A and B being 100% by weight, and suitable auxiliaries and additives, optionally pigments, optionally fillers, organic solvent and an acid catalyst, wherein the acid catalyst comprises:

1) a sulfo- or sulfono-succinic diester which contains at least one hydroxyl group and corresponds to the following formulae (I) or (II):

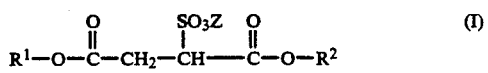

in which:

R$^1$ = a linear or branched alkyl or alkoxyalkyl radical having 2 to 12 carbon atoms and, if desired, up to 3 hydroxyl groups Z = H or NH$_n$R$_{4-n}$
with
n = 0–4 and
R = alkyl, hydroxyalkyl, aryl or hydroxyaryl, where R may be identical or different, or an aliphatic or aromatic N-heterocycle and/or 2) a sulfo- or sulfonic-succinic polyester which contains at least one hydroxyl group, and mixing components A and B with the catalyst and processing the mixture to form a coating composition.

3. The coating composition as claimed in claim 1, wherein the sulfo- or sulfonosuccinic ester used as catalyst is prepared by:
   a) reacting maleic anhydride with a diol and/or polyol to form the maleic monoester,
   b) esterifying the maleic monoester from a) with more diol and/or polyol until an acid number of <5 mg of KOH/g has been reached,
   c) sulfonating the maleic ester from 2 by adding sulfur dioxide, a hydrogen sulfite or a sulfite to the C—C double bond, and
   d) if desired, liberating the corresponding sulfosuccinic ester by reaction with a strong acid.

4. The coating composition as claimed in claim 1, wherein the acid catalyst is used in a proportion of more than 1 and up to 10% by weight relative to the binder solids, and the catalyst is preferably used in the form of the free sulfonic acid.

5. The coating composition as claimed in, claim 1, wherein the acid catalyst is used in a proportion of 0.1 to 2% by weight, relative to the binder solids.

6. The coating composition as claimed in claim 1, wherein the esterifying alcohol used is trimethylolpropane, propylene glycol and/or neopentyl glycol.

7. The coating composition as claimed in claim 1, wherein the hydroxy-functional catalyst is used together with a non-hydroxy-functional organic sulfonic acid, the proportion of non-hydroxy-functional organic sulfonic acid being not more than 50% by weight, relative to the total weight of sulfonic acid.

8. The coating composition as claimed in claim 1, wherein in order to prepare the hydroxyl-containing addition polymer A, a hydroxyalkyl ester is used which is selected from the group comprising 2-hydroxyethyl acrylate, 2-hydroxyethyl methacrylate, hydroxypropyl acrylate, hydroxypropyl methacrylate, 4-hydroxybutyl methacrylate and 4-hydroxybutyl acrylate.

9. The coating composition as claimed in claim 1, wherein component A) is obtained by copolymerization of:
   a$_1$) 10 to 60% by weight of hydroxyl-containing esters of acrylic acid and/or methacrylic acid having 2 to 14 carbon atoms in the alkyl radical,
   a$_2$) more than 3 and up to 30% by weight of ethylenically unsaturated monomers having at least 2 polymerizable double bonds, and
   a$_3$) 15 to 82% by weight of other polymerizable monomers having one olefinically unsaturated double bond,
the sum of the proportions by weight of a$_1$, a$_2$ and a$_3$ being 100% by weight.

10. The coating composition as claimed in claim 1, wherein part the hydroxyalkylester of α,β-ethylenically unsaturated carboxylic acid which is used is a reaction product of acrylic acid and/or methacrylic acid with the glycidyl ester of a carboxylic acid having a tertiary α-carboxylic atom or of the glycidyl ester of an α,β-ethylenically unsaturated carboxylic acid with a tertiary aliphatic carboxylic acid.

11. The coating composition as claimed in claim 1, wherein in part the hydroxyalkyl ester of α,β-ethylenically unsaturated carboxylic acid which is used is a reaction product of one mol of hydroxyethyl acrylate and/or hydroxyethyl methacrylate with an average of 2 mol of caprolactone.

12. The coating composition as claimed in claim 1, wherein the amino resin B) which is used is a melamine-formaldehyde resin.

13. The coating composition as claimed in claim 12 wherein the component B) which is used is hexamethoxymethylmelamine.

14. The coating composition as claimed in claim 3, wherein in step b) the maleic monoester from step a) is esterified with more diol and/or polyol until an acid number of <3 mg of KOH/g has been reached.

15. The coating composition as claimed in claim 1, wherein the acid catalyst is used in a proportion of 2 to 5% by weight relative to the binder solids, and the catalyst is preferably used in the form of the free sulfonic acid.

16. The coating composition as claimed in claim 1, wherein the acid catalyst is used in a proportion of 0.1 to 1% by weight relative to the binder solids.

17. The coating composition claimed in claim 9, wherein the a$_2$) 5 to 25% by weight of ethylenically unsaturated monomers having at least 2 polymerizable double bonds are employed.

18. A method of automobile repair finishing, comprising applying to the substrate a coating composition comprising
   A) 50 to 90% by weight of one or more hydroxyl-containing addition polymers, prepared by copolymerization of ethylenically unsaturated monomers which are in pat hydroxyalkyl esters of α,β-ethylenically unsaturated carboxylic acids and
   B) 10 to 50% by weight of one or more melamineformaldehyde crosslinking agents
the sum of the proportions by weight of A and B being 100% by weight, and suitable auxiliaries and additives, optionally pigments, optionally fillers, organic solvent and an acid catalyst, wherein the acid catalyst used comprises
   1) a sulfo- or sulfono-succinic diester which contains at least one hydroxyl group and corresponds to the following formulae (I) or (II):

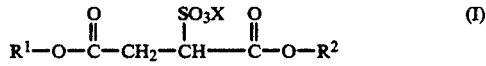

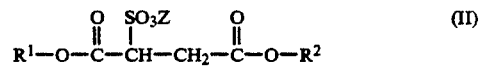

in which:
R$^1$ = a linear or branched alkyl or alkoxyalkyl radical having 2 to 12 carbon atoms and having 1, 2 or 3 hydroxyl groups
R$^2$ = a linear or branched alkyl or alkoxyalkyl radical having 2 to 12 carbon atoms and, if desired, up to 3 hydroxyl groups
Z = H or NH$_n$R$_{4-n}$ with
n=0-4 and
R=alkyl, hydroxyalkyl, aryl or hydroxyaryl, where R may be identical or different, or an aliphatic or aromatic N-heterocycle
and/or
2) a succinic polyester sulfonic acid and/or succinic polyester sulfonium salt in each case containing at least one hydroxyl group.

19. A method of coating a substrate comprising applying to the substrate a stoving paint comprising
A) 50 to 90% by weight of one or more hydroxyl-containing addition polymers, prepared by copolymerization of ethylenically unsaturated monomers which are in part hydroxyalkyl esters of $\alpha,\beta$-ethylenically unsaturated carboxylic acids and
B) 10 to 50% by weight of one or more melamineformaldehyde crosslinking agents
the sum of the proportions by weight of A and B being 100% by weight, and suitable auxiliaries and additives, optionally pigments, optionally fillers, organic solvent and an acid catalyst, wherein the acid catalyst used comprises:
1) a sulfo- or sulfonio-succinic diester which contains at least one hydroxyl group and corresponds to the following formulae (I) or (II):

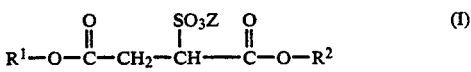

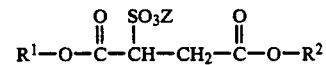

in which:
$R^1$ = a linear or branched alkyl or alkoxyalkyl radical having 2 to 12 carbon atoms and having 1, 2 or 3 hydroxyl groups
$R^2$ = a linear or branched alkyl or alkoxyalkyl radical having 2 to 12 carbon atoms and, if desired, up to 3 hydroxyl groups
Z = H or $NH_nR_{4-n}$
with
n = 0-4 and
R = alkyl, hydroxyalkyl, aryl or hydroxyaryl, where R may be identical or different, or an aliphatic or aromatic N-heterocycle
and/or
2) a succinic polyester sulfonic acid and/or succinic polyester sulfonium salt in each case containing at least one hydroxyl group.

* * * * *